US012708943B2

(12) United States Patent
Nelson et al.

(10) Patent No.: US 12,708,943 B2
(45) Date of Patent: Aug. 18, 2026

(54) ADAPTIVE DEPOSITION FOR INITIAL LAYER OF ADDITIVE MANUFACTURING PROCESS

(71) Applicants: Rolls-Royce Corporation, Indianapolis, IN (US); Rolls-Royce plc, London (GB)

(72) Inventors: Scott Nelson, Indianapolis, IN (US); David James Puhl, Indianapolis, IN (US); Clive Grafton-Reed, London (GB); Peter E. Daum, Indianapolis, IN (US); Robert F. Proctor, Indianapolis, IN (US); Christopher P. Heason, London (GB)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 267 days.

(21) Appl. No.: 18/593,235

(22) Filed: Mar. 1, 2024

(65) Prior Publication Data

US 2025/0276373 A1 Sep. 4, 2025

(51) Int. Cl.

| | |
|---|---|
| ***B22F 10/85*** | (2021.01) |
| ***B22F 10/368*** | (2021.01) |
| *B33Y 30/00* | (2015.01) |
| *B33Y 50/02* | (2015.01) |

(52) U.S. Cl.

CPC ............ *B22F 10/85* (2021.01); *B22F 10/368* (2021.01); *B22F 2203/11* (2013.01); *B33Y 30/00* (2014.12); *B33Y 50/02* (2014.12)

(58) Field of Classification Search

None

See application file for complete search history.

(56) References Cited

U.S. PATENT DOCUMENTS

| | | | | |
|---|---|---|---|---|
| 7,045,738 | B1 * | 5/2006 | Kovacevic | B23K 26/342 219/121.64 |
| 11,150,633 | B2 | 10/2021 | de Souza Borges Ferreira et al. | |
| 2002/0145213 | A1 * | 10/2002 | Liu | B29C 64/40 700/118 |

(Continued)

OTHER PUBLICATIONS

Mann, Stefan & Nottrodt, Oliver, "New sensor and system technology for higher process stability in LMD", 2019, Proc. of SPIE vol. 10911, pp. 1-8. (Year: 2019).*

*Primary Examiner* — Ariel Mercado-Vargas

(74) *Attorney, Agent, or Firm* — Shumaker & Sieffert, P.A.

(57) ABSTRACT

An additive manufacturing system includes an energy delivery device to deliver energy to a build surface of a deposit overlying a substrate to form a melt pool in the build surface, a powder delivery device to direct a powder stream toward the melt pool, and a computing device to determine a first set of deposition parameters for an innermost layer of the deposit overlying the substrate, determine a second set of deposition parameters for an inner plurality of layers of the deposit overlying the innermost layer, determine a third set of deposition parameters for an outer plurality of layers of the deposit overlying the inner plurality of layers, and control the energy delivery device and the powder delivery device to deposit the innermost layer, the inner plurality of layers, and the outer plurality of layers based on the respective first, second, and third sets of deposition parameters.

18 Claims, 5 Drawing Sheets

(56) References Cited

U.S. PATENT DOCUMENTS

| | | | | |
|---|---|---|---|---|
| 2015/0034606 | A1* | 2/2015 | Blackmore | B23K 15/02<br>219/76.14 |
| 2015/0261196 | A1* | 9/2015 | Wilson | B29C 64/393<br>700/119 |
| 2019/0047226 | A1* | 2/2019 | Ishikawa | B33Y 50/02 |
| 2022/0186381 | A1* | 6/2022 | Shuck | C23C 24/08 |
| 2023/0191543 | A1* | 6/2023 | Feied | B23P 23/02 |
| 2024/0042691 | A1* | 2/2024 | Buls | B22F 12/90 |
| 2025/0135540 | A1* | 5/2025 | Matthews | B22F 10/25 |
| 2025/0284270 | A1* | 9/2025 | Yavari | B33Y 10/00 |

* cited by examiner

10

COMPUTING DEVICE 12

DEPOSITION PARAMETERS 13

POWDER SOURCE 42

MASS SENSOR 44

46

ENERGY DELIVERY DEVICE 16

POWER DELIVERY DEVICE 14

40

30

PFMS 18

34

38

TOPOLOGY SENSOR 48

22

32

28

36

26B

26A

24

20

ADAPTIVE DEPOSITION FOR INITIAL LAYER OF ADDITIVE MANUFACTURING PROCESS

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures. In some instances, the three-dimensional structures may be formed on an underlying substrate, resulting in an interface that may be subject to different deposition conditions or operating stresses than other portions of the three-dimensional structures.

SUMMARY

The disclosure describes additive manufacturing systems, and methods for operating additive manufacturing systems, that manufacture a component by carefully controlling deposition of layers close to an underlying substrate. Layers of a deposit close to the underlying substrate may have a greater impact on adhesion of the deposit and integrity of the deposit and substrate than layers further from the substrate. The additive manufacturing system uses one or more sets of deposition parameters for these close layers that are different from layers further away from the substrate. For example, a layer directly overlying the substrate may be deposited in a manner that limits a temperature of the substrate and increases adhesion of the layer to the substrate. As another example, various inner layers overlying the substrate may be deposited in a manner that avoids melt back of the substrate and reduces defects in the inner layers. The additive manufacturing system may use in-situ monitoring of the melt pool to further control the deposition parameters to avoid damage that may be indicated by a temperature or size of the melt pool. In this way, a resulting component may have reduced damage to the substrate, reduced damage to the deposit, and/or greater adhesion between the deposit and the substrate compared to a component in which a same or similar set of deposition parameters are used to deposit layers close to and distant from the substrate.

In some examples, the disclosure describes an additive manufacturing system that includes an energy delivery device, a powder delivery device, and a computing device. The energy delivery device is configured to deliver energy to a build surface of a deposit overlying a substrate to form a melt pool in the build surface. The powder delivery device is configured to direct a powder stream toward the melt pool. The computing device is configured to determine a first set of deposition parameters for an innermost layer of the deposit overlying the substrate, determine a second set of deposition parameters for an inner plurality of layers of the deposit overlying the innermost layer, and determine a third set of deposition parameters for an outer plurality of layers of the deposit overlying the inner plurality of layers, in which the third set of deposition parameters is different from the first and second sets of deposition parameters. The computing device is further configured to control the energy delivery device and the powder delivery device to deposit the innermost layer on the substrate based on the first set of deposition parameters, deposit the inner plurality of layers on the innermost layer based on the second set of deposition parameters, and deposit the outer plurality of layers on the inner plurality of layers based on third set of deposition parameters. When operating based on the first set of deposition parameters, the energy delivery device delivers a first amount of energy to the build surface. When operating based on the second set of deposition parameters, the energy delivery device delivers a second amount of energy to the build surface. When operating based on the third set of deposition parameters, the energy delivery device delivers a third amount of energy to the build surface, which is different from each of the first and second amounts of energy.

In some examples, the disclosure describes a method for additive manufacturing that includes determining, by a computing device, a first set of deposition parameters for an innermost layer of a deposit overlying a substrate. The method further includes determining, by the computing device, a second set of deposition parameters for an inner plurality of layers of the deposit overlying the innermost layer. The method further includes determining, by the computing device, a third set of deposition parameters for an outer plurality of layers of the deposit overlying the inner plurality of layers. The third set of deposition parameters is different from the first and second sets of deposition parameters. The method further includes controlling, by the computing device, an energy delivery device configured to deliver energy to the build surface and a powder delivery device configured to direct a powder stream toward the melt pool to deposit the innermost layer on the substrate based on the first set of deposition parameters, deposit the inner plurality of layers on the innermost layer based on the second set of deposition parameters, and deposit the outer plurality of layers on the inner plurality of layers based on third set of deposition parameters. When operating based on the first set of deposition parameters, the energy delivery device delivers a first amount of energy to the build surface. When operating based on the second set of deposition parameters, the energy delivery device delivers a second amount of energy to the build surface. When operating based on the third set of deposition parameters, the energy delivery device delivers a third amount of energy to the build surface, which is different than each of the first and second amounts of energy.

The details of one or more examples are set forth in the accompanying drawings and the description below. Other features, objects, and advantages will be apparent from the description and drawings, and from the claims.

DETAILED DESCRIPTION

Figure 1A:
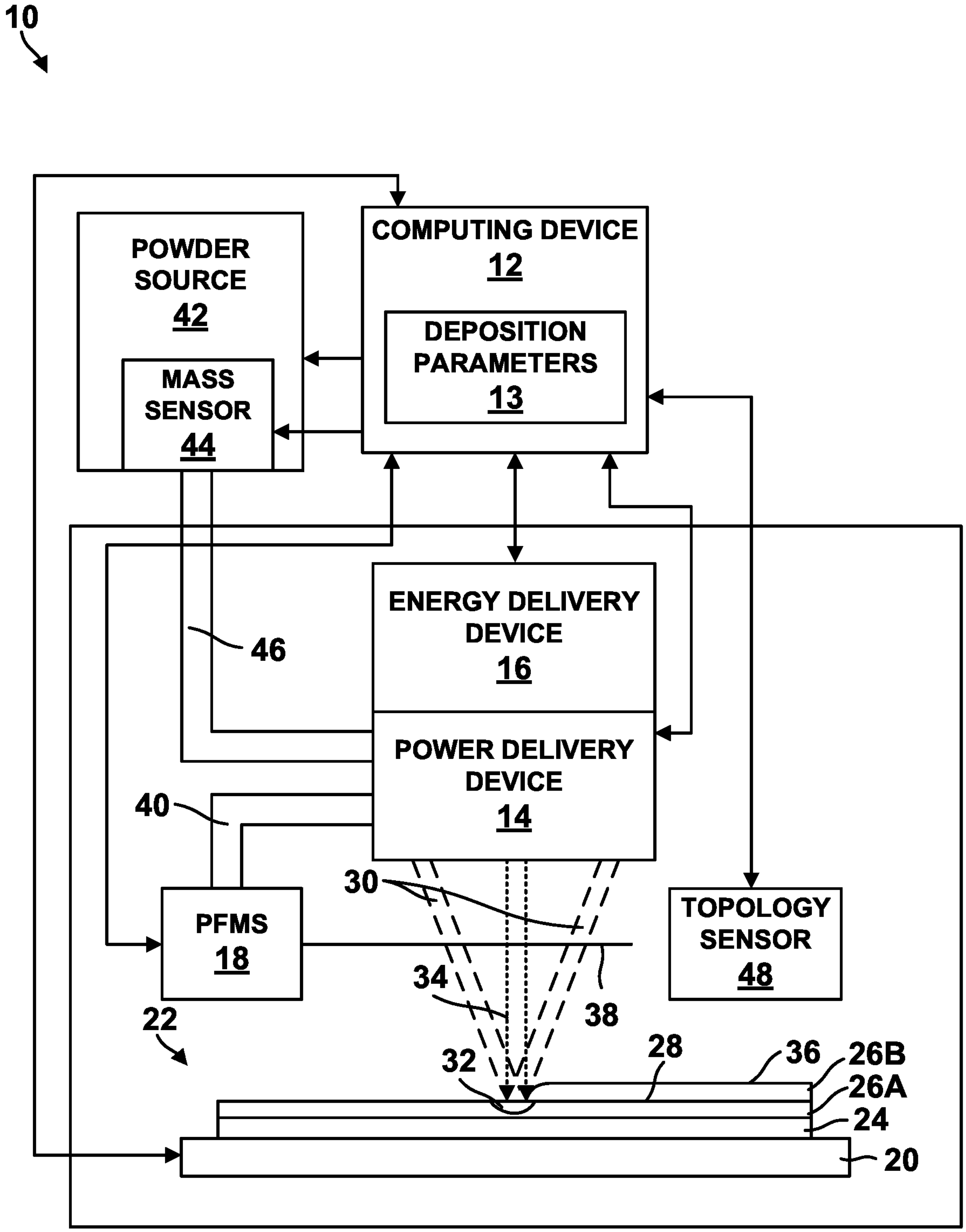
FIG. 1A is a conceptual block diagram illustrating mass flow monitoring aspects of an example additive manufacturing system that includes a powder flow monitoring system and a topology sensor for monitoring mass flow of powder during an additive manufacturing technique.

The disclosure generally describes techniques and systems for fabricating a component using a blown powder additive manufacturing technique, such as a directed energy deposition (DED) technique, by carefully controlling deposition of layers close to an underlying substrate. During blown powder additive manufacturing, a component is built up by adding material to the component in sequential layers. The final component is composed of a plurality of layers of material. In some blown powder additive manufacturing techniques for forming components from metals or alloys, an energy source may direct energy at a substrate to form a melt pool. A powder delivery device may deliver a powder to the melt pool, where at least some of the powder at least partially melts and is joined to the melt pool and, thus, substrate. The properties of the final component, including the presence or absence of material defects and the adhesion of the deposit to the substrate, are a function of a number of variables related to mass flux and heat flux.

Layers of a deposit close to the underlying substrate may have a greater impact on adhesion of the deposit and integrity of the deposit and substrate than layers further from the substrate. For example, the deposit and the substrate may be formed from different materials that have different properties, including different thermal properties such as melting points or coefficients of thermal expansion. During deposition of an innermost layer of a deposit, a surface portion of the substrate may be partially melted to mix with a portion of the innermost layer. While this melting may adhere the innermost layer to the substrate, underlying portions of the substrate may be exposed to high temperatures, damaging the substrate. Subsequent layers deposited on the innermost layer and close to the substrate may further expose the substrate to temperatures that cause the substrate to remelt, which may reduce an adhesion between the substrate and the innermost layer. Further, the innermost or subsequent layers may be subject to thermal stresses between the substrate and the deposit caused by a change in temperature, which may cause any defects or other anomalies in these layers to undergo damage, such as in the form of cracks.

In accordance with techniques of this disclosure, an additive manufacturing system may use one or more sets of deposition parameters for these close layers that are different from layers further away from the substrate. For example, the inner layer may be deposited in a manner that limits a temperature of the substrate and increases adhesion of the layer to the substrate. The various subsequent layers overlying the inner layer may be deposited in a manner that avoids melt back of the substrate and reduces defects in these layers. The additive manufacturing system may use in-situ monitoring to further control the deposition parameters to avoid damage to the substrate that may be indicated by a temperature or size of the melt pool. In this way, a resulting component may have reduced damage to the substrate, reduced damage to the deposit, and/or greater adhesion between the deposit and the substrate compared to a component in which a same or similar set of deposition parameters are used to deposit layers close to and distant from the substrate.

Figure 1B:
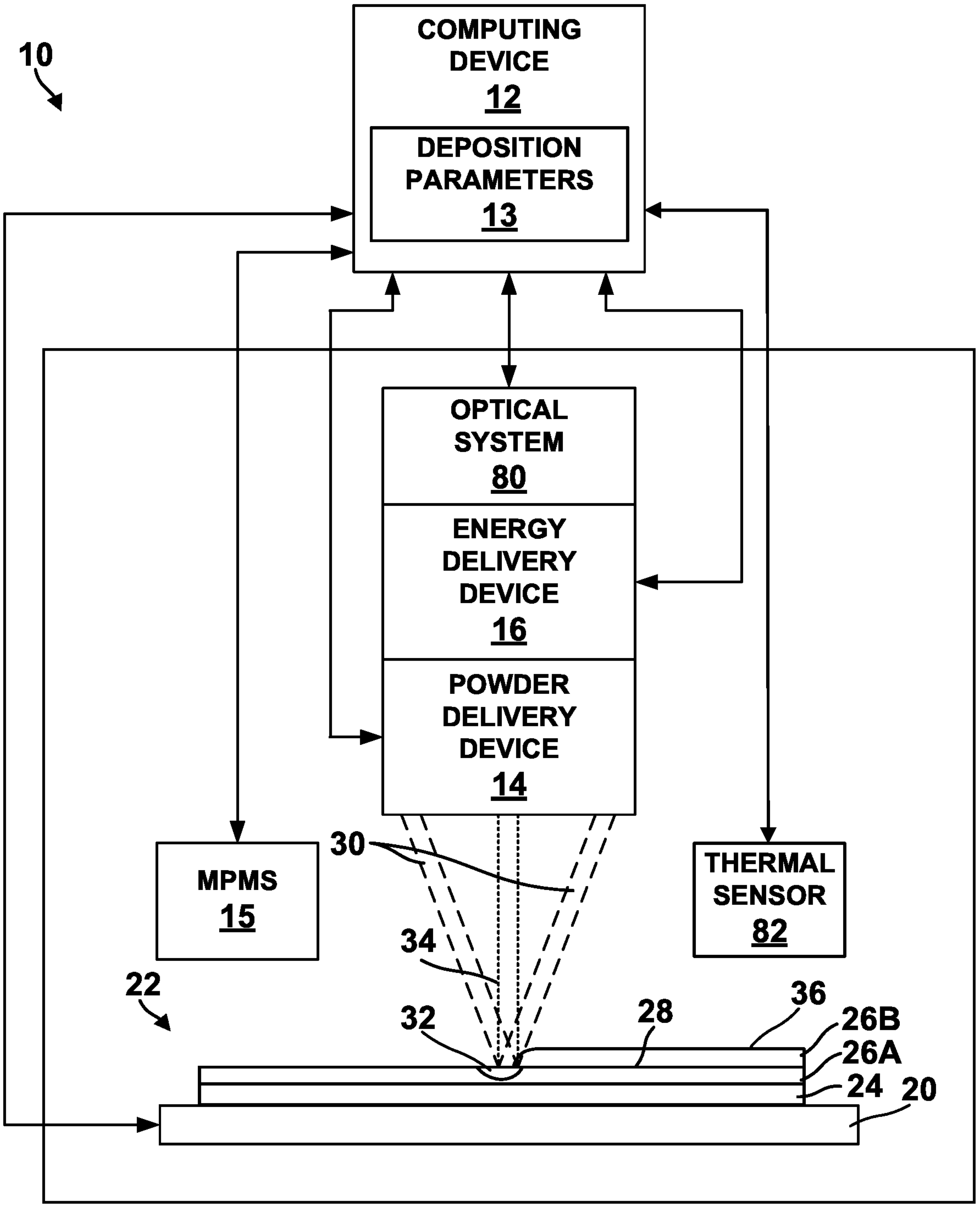
FIG. 1B is a conceptual block diagram illustrating heat flow monitoring aspects of the example additive manufacturing system of FIG. 1A, including a melt pool monitoring system, an optical system, and a thermal sensor for monitoring a melt pool during an additive manufacturing technique.

FIG. 1A is a conceptual block diagram illustrating mass flow monitoring aspects of an example additive manufacturing system 10 that includes a powder flow monitoring system (PFMS) 18 and a topology sensor 48 for monitoring mass flow of powder during an additive manufacturing technique. In the example illustrated in FIG. 1A, additive manufacturing system 10 includes a computing device 12, a powder delivery device 14, an energy delivery device 16, PFMS 18, a stage 20, a powder source 42, powder source mass sensor 44, and topology sensor 48. Computing device 12 is operably connected to powder delivery device 14, energy delivery device 16, PFMS 18, stage 20, powder source 42, powder source mass sensor 44, and topology sensor 48. To simplify illustration of FIG. 1A and improve clarity of the figure, heat flow monitoring aspects of additive manufacturing system 10 are shown in FIG. 1B and described below with reference to FIG. 1B.

In some examples, stage 20 is movable relative to energy delivery device 16 and/or energy delivery device 16 is movable relative to stage 20. Similarly, stage 20 may be movable relative to powder delivery device 14 and/or powder delivery device 14 may be movable relative to stage 20. For example, stage 20 may be translatable and/or rotatable along at least one axis to position component 22 relative to energy delivery device 16 and/or powder delivery device 14. Similarly, energy delivery device 16 and/or powder delivery device 14 may be translatable and/or rotatable along at least one axis to position energy delivery device 16 and/or powder delivery device 14, respectively, relative to component 22. Stage 20 may be configured to selectively position and restrain component 22 in place relative to stage 20 during manufacturing of component 22.

Powder source 42 is the source of powder for powder stream 30. Powder source 42 may include any suitable container or enclosure, such as a hopper, configured to hold powder. Powder source 42 also may include mechanism for entraining the powder in a gas flow. For instance, powder source 42 may be coupled to a gas source, which provides a gas flowing through powder source 42 and entraining powder within the gas flow. Additionally, or alternatively, powder source 42 may include an agitator configured to agitate the powder and increase entrainment of the powder in the gas stream. System 10 may include a powder source mass sensor 44 associated with powder source 42. Powder source mass sensor 44 may be configured to quantify loss of mass in the powder source 42 or, alternatively, a mass flow out of powder source 42.

Powder source 42 is fluidically coupled to powder delivery device 14 via a flow path 46. Flow path 46 may include any suitable structure(s) defining an enclosed flow between powder source 42 and powder delivery device, including conduit, pipe, tubes, or the like. Although not shown in FIG. 1A, for at least part of flow path 46 between powder source 42 and nozzles of powder delivery device 14, flow path 46 may split into multiple, parallel sections, e.g., one for each nozzle. Further, although not shown in FIG. 1A, in some examples, flow path 46 may include one or more nozzles for controlling flow through flow path 46 as a whole or portions of flow path 46 (e.g., a section associated with a particular nozzle of powder delivery device 14).

Powder delivery device 14 may be configured to deliver powder to selected locations of component 22 being formed via a powder stream 30. Powder delivery device 14 may include one or more nozzles that each output powder. The combined powder defines powder stream 30. In some examples, powder delivery device 14 includes a single nozzle, which may be point nozzle, or a single nozzle that is an annular channel. In other examples, powder delivery device 14 includes a plurality of nozzles (e.g., three nozzles or four nozzles). Regardless of the number of nozzles, powder delivery device 14 may output a powder stream that is focused at a focus plane. As powder delivery device 14 is movable in the z-axis shown in FIG. 1A relative to component 22, the focal plane of powder delivery device 14 also may be movable in the z-axis relative to component 22, such that the focus plane may be controlled to be substantially coincident with build surface 28. At least some of the powder in powder stream 30 may impact a melt pool 32 in component 22. At least some of the powder that impacts melt pool 32 may be joined to component 22.

Energy delivery device 16 may include an energy source, such as a laser source, an electron beam source, plasma source, or another source of energy that may be absorbed by component 22 to form a melt pool 32 and/or be absorbed by powder in powder stream 30 to be added to component 22. Example laser sources include a CO laser, a $CO_2$ laser, a Nd:YAG laser, or the like. In some examples, the energy source may be selected to provide energy with a predetermined wavelength or wavelength spectrum that may be absorbed by component 22 and/or the powder to be added to component 22 during the additive manufacturing technique. In some examples, energy delivery device 16 also includes an energy delivery head, which is operatively connected to the energy source. The energy delivery head may aim, focus, or direct energy 34 toward predetermined positions at or adjacent to a surface of component 22 during the additive manufacturing technique. As described above, in some examples, the energy delivery head may be movable in at least one dimension (e.g., translatable and/or rotatable) under control of computing device 12 to direct the energy toward a selected location at or adjacent to a surface of component 22.

In some examples, at least a portion of energy delivery device 16 and powder delivery device 14 may be combined or attached to each other. For example, a deposition head may include part of powder delivery device 14 (e.g., internal channels and powder nozzle(s) for forming powder stream 30 and directing powder stream 30 toward build surface 28) and part of energy delivery device 16 (e.g., the energy delivery head). As shown in FIG. 1A, in some examples, energy delivery device 16 may be arranged of configured such that energy 34 and powder stream 30 both exit from a common deposition head and are directed toward build surface 28. For instance, energy 34 may pass through a central channel within the deposition head and exit a central aperture in the deposition head, while fluidized powder may flow through internal channels and powder nozzle(s) for forming powder stream 30 and directing powder stream 30 toward build surface 28.

System 10 includes powder flow monitoring system (PFMS) 18. PFMS 18 is configured to image at least a portion of powder stream 30 to detect powder flowing between powder delivery device 14 and build surface 28. For example, PFMS 18 may include an illumination device and an imaging device. In some examples, the illumination device may include one or more light source. For instance, the illumination device may include one or more structured light devices, such as one or more lasers. The illumination device is configured to illuminate a plane of powder stream 30 at image plane 38, e.g., a plane substantially perpendicular to an axis extending between powder delivery device 14 and build surface 28. The imaging device of PFMS 18 is configured to image at least some of the illuminated powder. The imaging device may have a relatively high data acquisition speed (e.g., frame rate), such greater than 1000 Hz. Because of the velocity of the powder in powder stream 30, even such a frame rate may image only a fraction of the powder flowing between powder delivery device 14 and build surface 28.

PFMS 18 may be positionally fixed relative to powder delivery device 14 and/or energy delivery device 16, e.g., in the x-y plane shown in FIG. 1A. PFMS 18 may be movable in the z-axis direction of FIG. 1A (e.g., parallel to a longitudinal axis extending from powder delivery device 14 to build surface 28). This may enable movement of image plane 38 along the z-axis of FIG. 1A (e.g., parallel to a longitudinal axis extending from powder delivery device 14 to build surface 28). In this way, PFMS 18 may analyze powder stream 30 along powder stream 30 to help determine parameters of powder stream 30 along its length.

In some example, PFMS 18 may be positionally fixed relative to powder delivery device 14 and/or energy delivery device 16 and movable parallel to a longitudinal axis extending from powder delivery device 14 to build surface 28 by an adjustable z-stage 40. Adjustable z-stage 40 may be attached to energy delivery device 16, powder delivery device 14, or a portion of system 10 that moves energy delivery device 16 and/or powder delivery device 14, such that PFMS 18 moves in the x-y axis in registration with energy delivery device 16 and/or powder delivery device 14. Adjustable z-stage 40 may be controlled by computing device 12 to position PFMS 18 and image plane 38 relative to powder stream 30. Further, computing device 12 may control adjustable z-stage 40 to move PFMS 18 vertically and out of the way to allow powder delivery device 14 and energy delivery device 16 access to physically constrained areas, e.g., between vanes of a doublet or triplet of a nozzle guide vane for a gas turbine engine.

System 10 further includes a topology sensor 48. Topology sensor 48 is configured to monitor an amount of powder captured by melt pool 32 by imaging melt pool 32 and the added material, allowing the mass to be quantified (e.g., by computing device 12) using the dimensions of the added material and density of the material (powder). In some examples, topology sensor 48 includes a laser and a sensor (e.g., an imaging device), which senses laser light reflected by the structure being imaged (e.g., melt pool 32 and the added material). The laser may have a defined wavelength, which may affect the resolution of the topology sensor 48. In some examples, the wavelength and sensor may be selected such that the resolution of topology sensor 48 is a great as about 10 microns (e.g., about 6 microns). In some examples, topology sensor 48 may be positioned substantially directly above component 22 and may include an interferometer, which provides depth information based on the time from outputting a laser pulse to the sensing of the reflected light. In other examples, topology sensor 48 may be positioned at an offset with respect to component 22 such that the sensor senses depth information without using an interferometer.

Computing device 12 is configured to control components of system 10 and may include, for example, a desktop computer, a laptop computer, a workstation, a server, a mainframe, a cloud computing system, or the like. Computing device 12 is configured to control operation of system 10, including, for example, powder delivery device 14, energy delivery device 16, PFMS 18, stage 20, powder source 42, powder source mass sensor 44, and/or topology sensor 48. Computing device 12 may be communicatively coupled to powder delivery device 14, energy delivery device 16, PFMS 18, stage 20, powder source 42, powder source mass sensor 44, and/or topology sensor 48 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Although FIG. 1A illustrates a single computing device 12 and attributes all control and processing functions to that single computing device 12, in other examples, system 10 may include multiple computing devices 12, e.g., a plurality of computing devices 12. In general, control and processing functions described herein may be divided among one or more computing devices. For instance, system 10 may include controller for energy delivery device 16, powder delivery device 14, and stage 20, a separate controller for PFMS 18, and a separate computing device for analyzing data obtained by PFMS 18, mass sensor 44, and topology sensor 48. As another example, system may include a dedicated controller for each of energy delivery device 16, powder delivery device 14, stage 20, PFMS 18, and topology sensor 48, and a separate computing device for coordinating control of powder delivery device 14, energy delivery device 16, PFMS 18, stage 20, powder source 42, powder source mass sensor 44, and/or topology sensor 48 and analyzing data obtained by PFMS 18 powder source mass sensor 44, and/or topology sensor 48. Other examples of computing system architectures for controlling system 10 and analyzing data obtained from system 10 will be apparent and are within the scope of this disclosure.

Computing device 12 may be configured to control operation of powder delivery device 14, energy delivery device 16, adjustable z-stage 40, stage 20, and/or topology sensor 48 to position component 22 relative to powder delivery device 14, energy delivery device 16, PFMS 18, and/or topology sensor 48. For example, as described above, computing device 12 may control stage 20 and powder delivery device 14, energy delivery device 16, adjustable z-stage 40 and/or topology sensor to translate and/or rotate along at least one axis to position component 22 relative to powder delivery device 14, energy delivery device 16, PFMS 18, and/or topology sensor 48. Positioning component 22 relative to powder delivery device 14, energy delivery device 16, PFMS 18, and/or topology sensor 48 may include positioning a predetermined surface (e.g., a surface to which material is to be added) of component 22 in a predetermined orientation relative to powder delivery device 14, energy delivery device 16, PFMS 18, and/or topology sensor 48.

Computing device 12 may be configured to control system 10 to deposit layers 26A and 26B on a substrate 24 to form component 22 based on a set of deposition parameters 13. As shown in FIG. 1A, component 22 may include a first layer 26A overlying substrate 24 and a second layer 26B overlying first layer 26A, although many components may be formed of additional layers, such as tens of layers, hundreds of layers, thousands of layers, or the like. Component 22 in FIG. 1A is simplified in geometry and the number of layers compared to many components formed using additive manufacturing techniques. Although techniques are described herein with respect to component 22 including substrate 24, first layer 26A and second layer 26B, the technique may be extended to components 22 with more complex geometry and any number of layers.

To form component 22, computing device 12 may control powder delivery device 14 and energy delivery device 16 to form, on a surface 28 of first layer 26A of material, a second layer 26B of material using an additive manufacturing technique. Computing device 12 may control energy delivery device 16 to deliver energy 34 to a volume at or near surface 28 to form melt pool 32. For example, computing device 12 may control the relative position of energy delivery device 16 and stage 20 to direct energy to the volume. Computing device 12 also may control powder delivery device 14 to deliver powder stream 30 to melt pool 32. For example, computing device 12 may control the relative position of powder delivery device 14 and stage 20 to direct powder stream 30 at or on to melt pool 32. Computing device 12 may control powder delivery device 14 and energy delivery device 16 to move energy 34 and powder stream 30 along build surface 28 in a pattern until layer 26B is complete. Computing device 12 then may control a z-axis position of stage 20 and/or powder delivery device 14 and energy delivery device 16 such that melt pool 32 will be formed on surface 36 of second layer 26B, and may control powder delivery device 14 and energy delivery device 16 to move energy 34 and powder stream 30 along build surface 28 in a pattern until layer 26B is complete. Computing device 12 may control powder delivery device 14 and energy delivery device 16 similarly until all layers are formed to define a completed component 22.

As described above, system 10 may include both mass flow monitoring and heat flow monitoring, but FIG. 1A illustrates only mass flow monitoring aspects of system 10. FIG. 1B is a conceptual block diagram illustrating heat flow monitoring aspects of the example additive manufacturing system of FIG. 1A, including a melt pool monitoring system (MPMS) 15, an optical system 80, and a thermal sensor 82 for monitoring a melt pool, such as a size and/or temperature, during an additive manufacturing technique. Identical reference numerals in FIGS. 1A and 1B refer to the same parts. Further, those common parts are the same or substantially identical, aside from any differences described herein.

As shown in FIG. 1B, system 10 includes an optical system 80. During additive manufacturing, component 22 is built up by adding material to component 22 in sequential layers. The final component is composed of a plurality of layers of material. Energy delivery device 16 may direct energy 34 at first layer 26A to form melt pool 32. Powder delivery device 14 may deliver powder stream 30 to melt pool 32, where at least some of the powder at least partially melts and is joined to first layer 26A. Melt pool 32 cools as energy 34 is no longer delivered to that location of first layer 26A (e.g., due to energy delivery device 16 scanning energy 34 over the surface of first layer 26A). The temperature and cooling rate of melt pool 32 and the surrounding areas of first layer 26A affect the microstructure of the component 22 formed using the additive manufacturing technique.

In many cases, energy 34 output by energy delivery device 16 is very high temperature and the intensity of its thermal emissions is significantly greater than the intensity of thermal emissions from melt pool 32 and the surrounding areas. Similarly, thermal emissions intensity at and near the center of melt pool 32 may be significantly greater than the intensity of thermal emissions near the edge of melt pool 32 and in areas surrounding melt pool 32. Because of this, it may be difficult to accurately measure temperature and cooling rate of areas near the edge of melt pool 32 and in areas surrounding melt pool 32. This results in difficulty predicting and controlling microstructure of the additively manufactured component 22.

Optical system 80 may include an imaging device and an associated optical train, which senses emissions at or near component 22 during the additive manufacturing technique. For example, optical system 80 may include a visible light imaging device, an infrared imaging device, or an imaging device that is configured (e.g., using a filter) to image a specific wavelength or wavelength range.

The optical train may include one or more reflective, refractive, diffractive optical components configured to direct light to the imaging device. For example, the optical train may be configured to direct light from near component 22 and/or melt pool 32 to the imaging device. In some examples, at least a portion of the optical train is coaxial with the axis at which energy delivery device 16 outputs energy, and the at least a portion of the optical train may be attached to or otherwise configured to move with the portion of energy delivery device 16 that directs or focuses energy 34 at or near the surface of component 22. In this way, optical system 80 may move with energy delivery device 16 and track melt pool 32 as melt pool 32 moves across component 22, without needing to correct for any offsets between energy delivery device 16 and optical system 80 and/or needing to correct for geometry of component 22. In other examples, the optical train may not be coaxial with the axis at which energy delivery device 16 outputs energy 34, and computing device 12 may be configured to compensate for the offset and any affects this may have on the imaging, including shadowing, interference, geometry of component 22, or the like.

Optical system 80 may include an occulting device. The occulting device is configured to reduce or block emissions (e.g., thermal emissions) that originate from the energy output by energy delivery device 16 and/or near a center of melt pool 32, which otherwise obfuscate emissions from solidifying regions of material at or near the edge of melt pool 32 and outside of melt pool 32. The occulting device may be a rigid occulting device or a dynamic occulting device. A rigid occulting device reduces or blocks emissions from a fixed region, e.g., from the energy 34 output by energy delivery device 16. For instance, a rigid occulting device may include a device with fixed dimensions that is opaque to wavelengths of interest. As another example, a rigid occulting device may include an apodizing lens in which a center of the lens if substantially opaque to wavelengths of interest and opacity decreases as a function of radius.

A dynamic occulting device is configured to be controlled to occult different regions, e.g., different sizes and/or shapes. A dynamic occulting device may include a rigid occulting device that is mounted to a device that can translate the rigid occulting device along and/or perpendicularly to the optical axis. As another example, a dynamic occulting device may include an opaque and viscous liquid, such as mercury, contained between two substrates. The substrates are substantially transparent to the wavelength(s) of interest. One or both of the substrates may be movable relative to the other substrate to control the distance between the substrates. By reducing the distance between the substrates, the size of the occulting region may increase. By increasing the distance between the substrates, the size of the occulting region may decrease. As a third example, a dynamic occulting device may include a digital micromirror device. Computing device 12 may be configured to control the micromirrors of the digital micromirror device to direct emissions that originate from energy 34 output by energy delivery device 16 and/or near a center of the melt pool away from the imaging device. A digital micromirror device may enable control of both the size and shape of the region of emissions that are occulted.

Surrounding melt pool 32 is a cooling zone, in which temperature gradients from the temperature of melt pool 32 to ambient temperature are present. Melt pool 32 and the cooling zone may emit thermal emissions (e.g., thermal radiation), which travel through optical system 80 to an imaging device, which images the thermal emissions. The occulting device may occult (e.g., reduces the intensity of or substantially eliminates) thermal emissions from a selected region, e.g., a region corresponding to energy 34 and at least a portion of melt pool 32. This may allow the imaging device to more effectively image relatively lower intensity thermal emissions from at or near the edge of melt pool 32 and within the cooling zone. This may enable more accurate measurement of temperatures within the cooling zone, and heat flow within the cooling zone.

System 10 includes melt pool monitor system ("MPMS") 15. MPMS 15 may be communicatively coupled to a thermal sensor 82 for monitoring a characteristic of melt pool 32. Thermal sensor 82 may include an imaging system, such as a visual or thermal camera, e.g., camera to visible light or infrared (IR) radiation. A visible light camera may monitor the geometry of the melt pool, e.g., a width, diameter, shape, or the like. A thermal (or IR) camera may be used to detect the size, temperature, or both of the melt pool. In some examples, a thermal camera may be used to detect the temperature of the melt pool at multiple positions within the melt pool, such as a leading edge, a center, and a trailing edge of the melt pool. In some examples, the imaging system may include a relatively high speed camera capable of capturing image data at a rate of tens or hundreds of frames per second or more, which may facilitate real-time detection of the characteristic of the melt pool.

Figure 2:
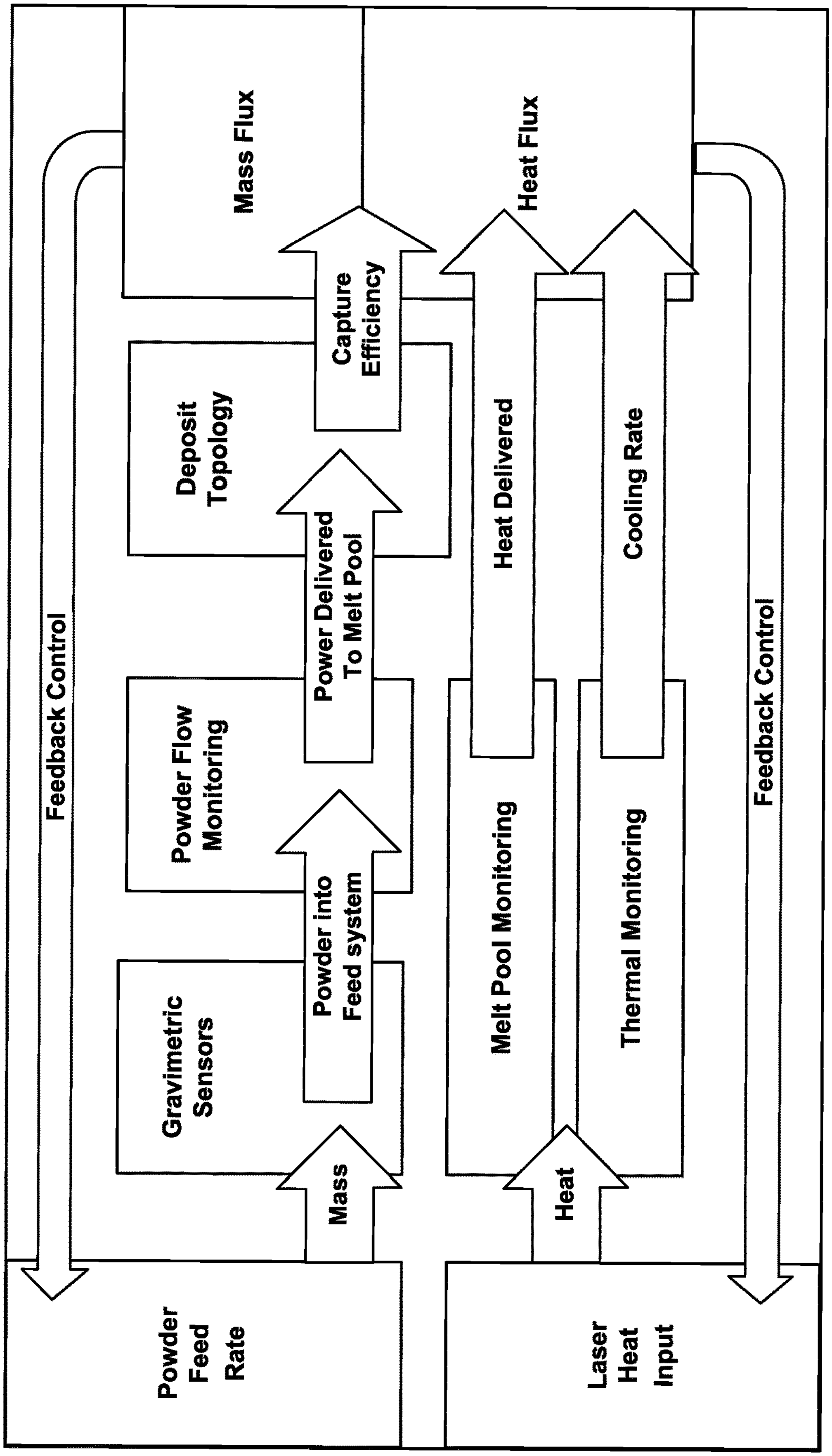
FIG. 2 is a process flow diagram illustrating a mass flux and heat flux monitoring and control technique.

FIG. 2 is a process flow diagram illustrating a mass flux and heat flux monitoring and control technique. The technique of FIG. 2 may be implemented by system 10 of FIGS. 1A and 1B and will be described with concurrent reference to FIGS. 1A and 1B. However, it will be appreciated that system 10 may perform other techniques and the technique of FIG. 2 may be performed by other systems.

One or more computing devices 12 may be configured to control a powder feed rate output by powder source 42 (see top left of FIG. 2). For instance, one or more computing devices 12 may be configured to control an agitator of powder source 42, a gas flow rate of gas flowing through powder source 42, a position of one or more valves within flow path 46, or the like to control a powder feed rate output by powder source 42. One or more computing devices 12 may be configured to receive data from one or more mass flow monitoring sensors, including PFMS 18, powder source mass sensor 44, and/or topology sensor 48. Data received from powder source mass sensor 44 indicates a mass flow of powder from powder source 42 to powder delivery device. Data from PFMS 18 indicates a mass flow of powder in powder stream 30 between powder delivery device 14 to adjacent melt pool 32. Data from topology sensor 48 indicates powder mass captured by melt pool 32 and added to component 22.

One or more computing devices 12 may calculate one or more mass flow-related metrics based on the data received from PFMS 18, powder source mass sensor 44, and/or topology sensor 48. For example, one or more computing devices 12 may determine a capture efficiency by determining a fraction or percentage of powder from powder stream 30 that is captured by melt pool 32 and added to component 22, e.g., by dividing the powder mass captured by melt pool 32, as determined based on data from topology sensor, into the mass flow determined based on data received from PFMS 18. Further, one or more computing devices 12 may determine an overall mass flux using the data received from PFMS 18, powder source mass sensor 44, and/or topology sensor 48. One or more computing devices 12 then may use the overall mass flux as an input to the control algorithm used to control the powder feed rate output by powder source 42 (see top left of FIG. 2).

Similarly, one or more computing devices 12 may be configured to control energy delivery device 16 to deliver energy 34 to first layer 26A to establish a given heat input (see bottom left of FIG. 2). For example, one or more computing device 12 may control one or more operating parameters of energy delivery device 16, such as intensity, pulse rate, pulse width, or the like; one or more positional parameters related to energy delivery device 16, such as dwell time at a location, a movement rate relative to first layer 26A, an overlap between adjacent passes of energy 34 across first layer 26A, a pause time between adjacent passes of energy 34 across first layer 26A, or the like to control heat input to system 10 (e.g., to melt pool 32 and component 22). One or more computing devices 12 may be configured to receive data from one or more heat sensors, such as MPMS 15, optical system 80, and/or thermal sensor 82.

One or more computing devices 12 may determine a cooling rate and associated heat from using thermal data from thermal sensor 82 and/or optical system 80 and may determine a heat input into component 22 using a size and/or temperature of melt pool 32 as observed by melt pool monitor. One or more computing devices 12 may be configured to determine an overall heat flux using these data. One or more computing devices 12 then may use the overall heat flux as an input to the control algorithm used to control the energy delivery by energy delivery device 16 (see top left of FIG. 2). In some examples, one or more computing devices 12 also may use the deposit topology (captured powder mass) and/or capture efficiency metric in the determination of the heat flux, as the added powder mass and quench effects associated with the captured powder affect the cooling rate.

Figure 3:
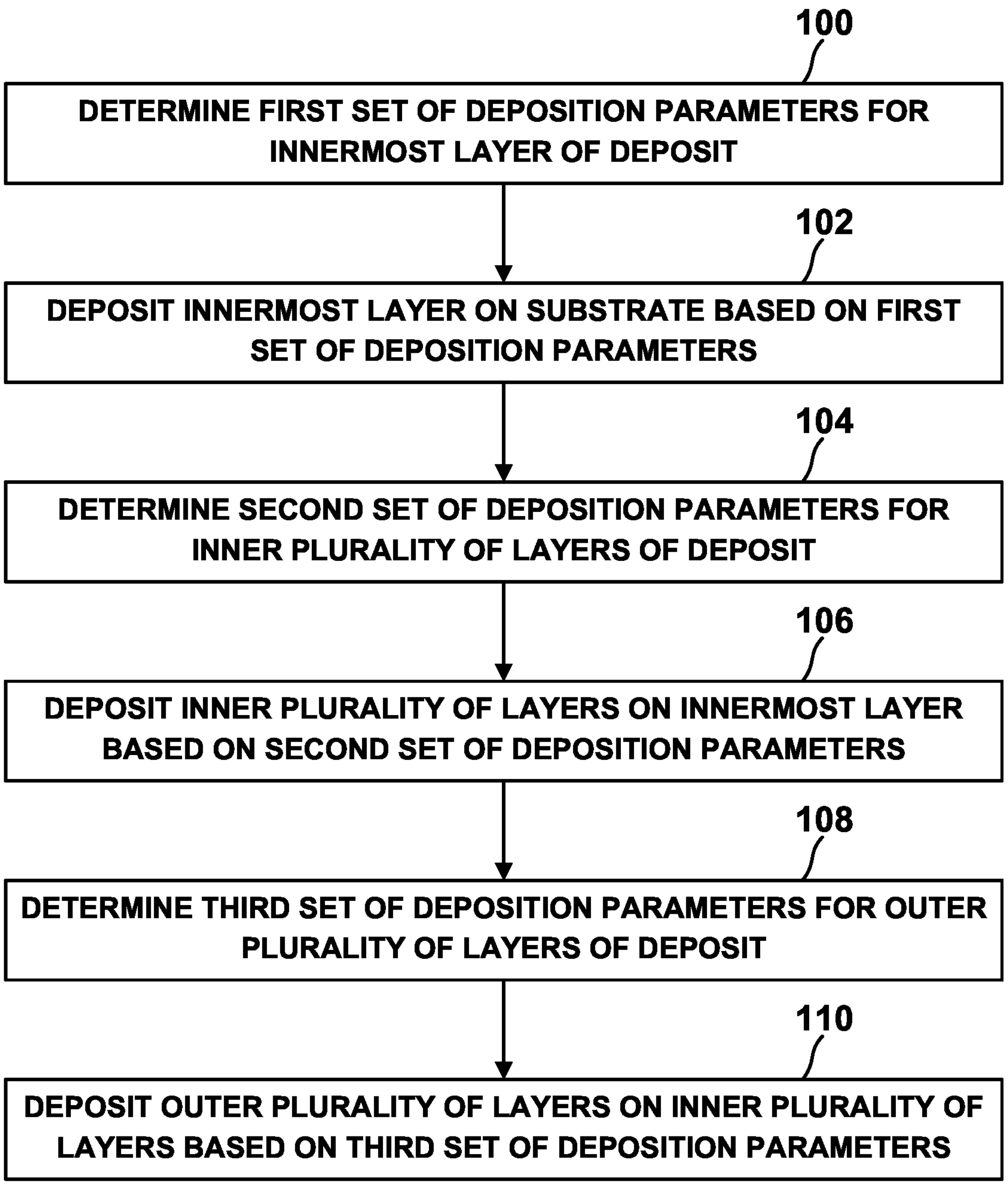
FIG. 3 is a flowchart illustrating an example method for fabricating a component.
Figure 4A:
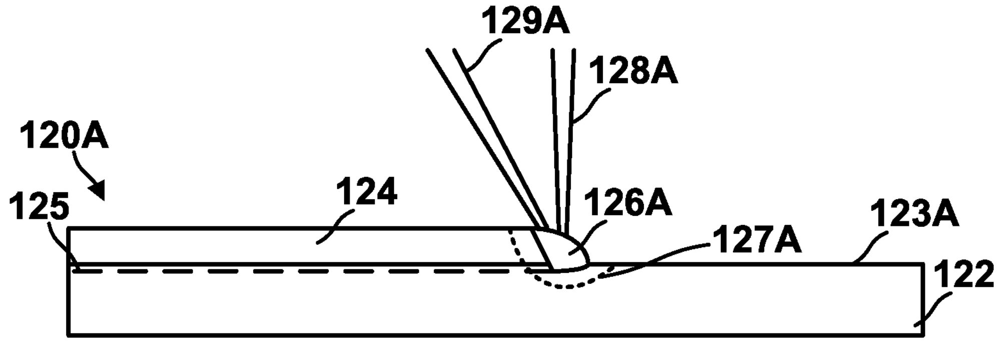
FIG. 4A is a cross-sectional side view diagram illustrating deposition of a first layer on a substrate.

FIG. 3 is a flowchart illustrating an example method for fabricating a component. The example method of FIG. 3 will be described with respect to FIGS. 4A-4C below. The example method of FIG. 3 includes determining a first set of deposition parameters for an innermost layer of a deposit overlying a substrate (100). FIG. 4A is a cross-sectional side view diagram illustrating deposition of an innermost layer 124 of a deposit 120A on a substrate 122. The first set of deposition parameters is configured to cause an energy delivery device to deliver a first amount of energy 128A to a build surface 123A of deposit 120A to form a melt pool 126A in build surface 123A, and cause a powder delivery device to direct a powder stream 129A toward melt pool 126A, thereby fusing the powder and forming innermost layer 124. An amount of energy may be quantified in any number of ways including, but not limited to, a heat flux, a beam power, or any other metric that quantifies energy delivered to a particular area or volume.

Energy 128A delivered to build surface 123A to form melt pool 126A may cause at least a portion of substrate 122 to melt, as indicated by a melt zone 125. In addition to melt zone 125, energy 128A may further cause a portion of substrate 122 to heat above a temperate that may affect an integrity of substrate 122, as indicated by heat affected zone 127A. In examples in which deposit 120A and substrate 122 are formed from different materials, substrate 122 may be particularly susceptible to thermal damage due to different thermal properties of substrate 122 and deposit 120A. For example, a melting point and/or sintering temperature of deposit 120A may be greater than a melting point of substrate 122.

The first set of deposition parameters may be configured to maintain a temperature of substrate 122 below a temperature that corresponds to thermal damage of substrate 122. A lower temperature of substrate 122 may correspond to a reduced amount of thermal damage to substrate 122. The first set of deposition parameters may reduce a size of heat affected zone 127A while still maintaining adequate energy 128A for forming innermost layer 124. A temperature of substrate 122 and size or depth of heat affected zone 127A may be influenced by the first amount of energy 128A input into melt pool 126A and an amount of energy dissipated from substrate 122. As such, the first set of deposition condition may include deposition parameters that are configured to reduce an amount of energy 128A input into melt pool 126A and/or increase an amount of energy dissipated from portions of substrate 122 proximate to melt pool 126A.

In some examples, the first set of deposition parameters may be configured to limit the first amount of energy 128A to build surface 135A to reduce a temperature of substrate 122. For example, the first set of deposition parameters may be configured to maintain a size and/or temperature of melt pool 126A at or below a threshold that corresponds to thermal damage of substrate 122. A smaller size and/or lower temperature of melt pool 126A may generally result in a lower temperature of substrate 122 and, correspondingly, a reduced amount of thermal damage to substrate 122. The first set of deposition parameters may be configured to reduce a size of heat affected zone 127A while still maintaining adequate energy 128A for forming innermost layer 124.

In some examples, the first set of deposition parameters may be configured to permit cooling of substrate 122 to reduce a temperature of substrate 122. For example, the first set of deposition parameters may define a toolpath of melt pool 126A that permits portions of substrate 122 recently exposed to energy 128A sufficient time to cool, such that a temperature of the particular portion may be reduced. Deposition parameters related to the toolpath may include, but are not limited to, a length of time of move pauses (e.g., increasing a time of move pauses), a spatial configuration of the toolpath (e.g., increasing a spacing between a particular run), and any other parameter that may affect an amount time between exposures to energy 128A.

The example method of FIG. 3 includes depositing innermost layer 124 on substrate 122 based on the first set of deposition parameters (102). For example, computing device 12 may control energy delivery device 16 and powder delivery device 14 to deposit innermost layer 124 on substrate 122 based on the first set of deposition parameters. During deposition, a temperature of substrate 122 may remain sufficiently low to reduce thermal damage to substrate 122 and ensure adequate adhesion between substrate 122 and innermost layer 124.

In some examples, computing device 12 may receive thermal data from at least one sensor during deposition of innermost layer 124. The thermal data is indicative of a size and/or temperature of melt pool 126A. Computing device 12 may further determine and/or adjust the first set of deposition parameters based on the thermal data. For example, computing device 12 may control one or more deposition parameters related to the first amount of energy 128A to maintain the temperature and/or size of melt pool 126A below a target threshold. This target threshold may correspond to a temperature of substrate 122 deemed acceptable for maintaining a low or absent amount of thermal damage.

In some examples, computing device 12 may receive beam data from at least one sensor during deposition of innermost layer 124. The beam data is indicative of an energy beam size from energy delivery device 16. Computing device 12 may further determine and/or adjust the first set of deposition parameters based on the beam data. For example, computing device 12 may control one or more deposition parameters related to the first amount of energy 128A to maintain the size of a beam of energy 128A below a target threshold. This target threshold may correspond to a temperature of substrate 122 deemed acceptable for maintaining a low or absent amount of thermal damage.

Figure 4B:
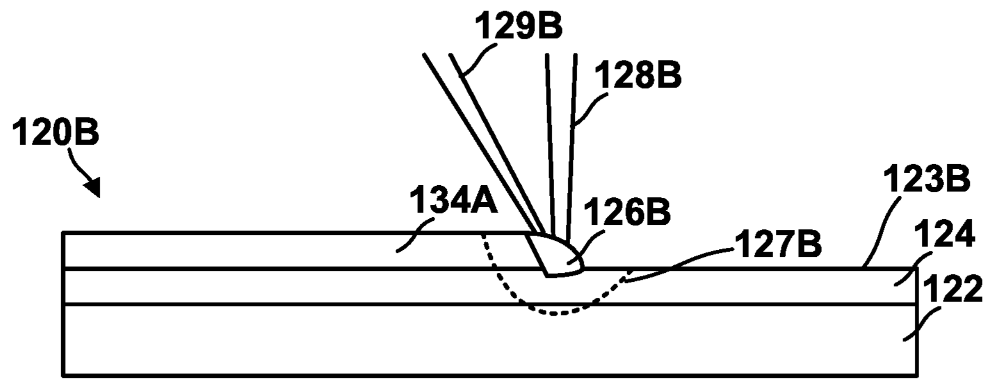
FIG. 4B is a cross-sectional side view diagram illustrating deposition of an inner plurality of layers on the first layer.

The example method of FIG. 3 includes determining a second set of deposition parameters for an inner plurality of layers of the deposit overlying the innermost layer (104). FIG. 4B is a cross-sectional side view diagram illustrating deposition of an inner plurality of layers 134 ("inner layers 134") of a deposit 120B on innermost layer 124. In the example of FIG. 4B, only a single, initial layer 134A of inner layers 134 is shown. While inner layers 134 may not directly contact substrate 122 like innermost layer 124, inner layers 134 may still have a greater effect on an integrity of deposit 120B than other, overlying layers due to a proximity to substrate 122. In some examples, a depth of inner layers 134 may be less than about 1 centimeter, such as less than about 1 millimeter.

The second set of deposition parameters is configured to cause an energy delivery device to deliver a second amount of energy 128B to a build surface 123B of deposit 120B to form a melt pool 126B in build surface 123B, and cause a powder delivery device to direct a powder stream 129B toward melt pool 126B, thereby fusing the powder and forming innermost layer 124. The second amount of energy 128B may cause at least a portion of innermost layer 124 to melt.

The second set of deposition parameters may influence a quality of inner layers 134. For example, a number and size of defects in inner layers 134 may increase with increasing powder flow rate of powder stream 129B and increasing amount of energy 128B. When subjected to stresses during operation of a component, these defects may form cracks or other more severe anomalies that negatively affect an integrity of deposit 120B. For inner layer 134, stresses may be particularly high due to a proximity of inner layers 134 to substrate 122. For example, a coefficient of thermal expansion of deposit 120B may be different from a coefficient of thermal expansion of substrate 122, creating thermal stresses in response to a change in temperature. These thermal stresses may cause or accelerate cracks from the defects, resulting in delamination or other damage near an interface of substrate 122 and deposit 120B.

In some examples, the second set of deposition parameters may be configured to limit the second amount of energy 128B to build surface 123B to reduce a number and/or size of defects in inner layers 134. For example, the second set of deposition parameters may be configured to maintain a size and/or temperature of melt pool 126B at or below a threshold that corresponds to reduced build quality of inner layers 134. A smaller size and/or lower temperature of melt pool 126B may generally result in more uniform deposition parameters at melt pool 126B and, correspondingly, a reduced number and/or magnitude of defects in inner layers 134. In some examples, a predicted build quality of inner layers 134 may be determined through materials modeling. For example, computing device 12 may model a predicted microstructure that results from a particular set of deposition parameters and select the second set of parameters that would reduce a number or magnitude of defects based on the modeling.

In addition to melting part of innermost layer 124, energy 128B may further cause a portion of innermost layer 124 and substrate 122 to heat above a temperate that may affect an integrity of innermost layer 124 and/or substrate 122, as indicated by heat affected zone 127B. In examples in which deposit 120B and substrate 122 are formed from different materials, substrate 122 may be particularly susceptible to thermal damage due to different thermal properties of substrate 122 and deposit 120B. For example, a melting point and/or sintering temperature of deposit 120B may be greater than a melting point of substrate 122, such that outer portions of substrate 122 may melt prior to inner portions of innermost layer 124. In some instances, a temperature of substrate 122 may increase above a melting point of substrate 122, causing substrate 122 to re-melt ("melt back").

In some examples, the second set of deposition parameters may be configured to limit the second amount of energy 128B to build surface 123B to reduce a temperature of substrate 122. For example, the second set of deposition parameters may be configured to maintain a size and/or temperature of melt pool 126B at or below a threshold that corresponds to melt back of substrate 122. A smaller size and/or lower temperature of melt pool 126B may generally result in a lower temperature of substrate 122 and, correspondingly, a reduced melt back of substrate 122. The first set of deposition parameters may be configured to reduce a size of heat affected zone 127B while still maintaining adequate energy 128B for forming inner layers 134.

In some examples, the second set of deposition parameters may be configured to permit cooling of substrate 122 to reduce a temperature of substrate 122. For example, the first set of deposition parameters may define a toolpath of melt pool 126B that permits portions of substrate 122 recently exposed to heat affected zone 127B sufficient time to cool, such that a temperature of the particular portion may be reduced.

The example method of FIG. 3 includes depositing the inner plurality of layers on the innermost layer based on the second set of deposition parameters (106). For example, computing device 12 may control energy delivery device 16 and powder delivery device 14 to deposit the inner layers 134 on innermost layer 124 based on the second set of deposition parameters. During deposition, deposition conditions at melt pool 126A may remain sufficiently constant to reduce defects in inner layers 134 and/or a temperature of substrate 122 may remain sufficiently low to prevent melt back to substrate 122.

In some examples, computing device 12 may receive thermal data and/or beam data from at least one sensor during deposition of inner layers 134. Computing device 12 may further determine and/or adjust the first set of deposition parameters based on the thermal and/or beam data. For example, computing device 12 may control one or more deposition parameters related to the second amount of energy 128B to maintain the temperature and/or size of melt pool 126A below a target threshold and/or maintain the size of a beam of energy 128A below a target threshold. These target thresholds may correspond to a sufficiently low formation rate of inner layers 134 for reducing formation of defects and/or sufficiently low temperature of substrate 122 for avoiding melt back.

While innermost layer 124 and inner layers 134 have been described as having different target results, in some examples, the first set of deposition parameters is substantially similar to the second set of deposition parameters. For example, build quality of inner layers 134, which may include innermost layer 124, may be more limiting than a temperature effect of energies 128A and 128B to substrate 122, such that deposition of both innermost layer 124 and inner layers 134 may be controlled according to a same or similar set of deposition parameters to reduce defects. In some examples, the first set of deposition parameters is different from the second set of deposition parameters. For example, substrate 122 may be more sensitive to thermal damage when depositing innermost layer 124 than melt back when depositing inner layers 134, such that first amount of energy 128A may be less than the second amount of energy 128B.

Figure 4C:
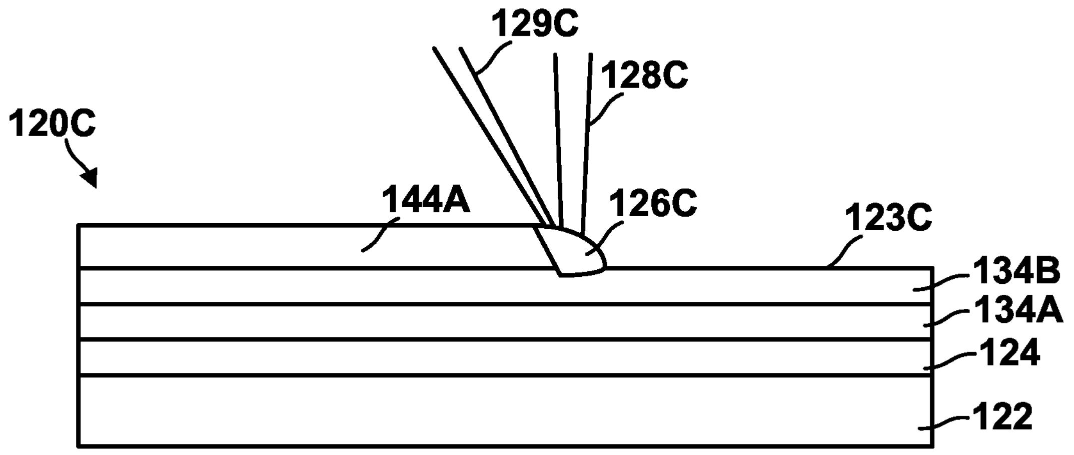
FIG. 4C is a cross-sectional side view diagram illustrating deposition of an outer plurality of layers on the inner plurality of layers.

The example method of FIG. 3 includes determining a third set of deposition parameters for an outer plurality of layers of the deposit overlying the inner plurality of layers (108). FIG. 4C is a cross-sectional side view diagram illustrating deposition of an outer plurality of layers 144 of a deposit 120C on inner layers 134. The third set of deposition parameters is configured to cause an energy delivery device to deliver a third amount of energy 128C to a build surface 123C of deposit 120C to form a melt pool 126C in build surface 123C, and cause a powder delivery device to direct a powder stream 129C toward melt pool 126C, thereby fusing the powder and forming outer layer 144A. The third set of deposition parameters may be configured to maintain a size of melt pool 126C to efficiently fabricate a remainder of component 22. The third set of deposition parameters is different from the first and second sets of deposition parameters, and corresponds to a set of parameters for forming a bulk of a component that may be sufficiently removed from substrate 122 to not substantially affect adhesion of deposit 120C to substrate 122. As such, the third amount of energy 128C is different than the first and second amounts of energy 128A or 128B. For example, outer layer 144A may be formed at a faster rate than underlying layers, such that the third amount of energy may be relatively higher than for an otherwise slower rate. However, underlying layers of outer layer 144A during deposition of outer layer 144A may be at a relatively high temperature compared to substrate 122 during deposition of the underlying layers, such that the third amount of energy may be relatively lower than the second amount of energy, despite outer layer 144A being formed at a faster rate. In some examples, the third amount of energy may be greater than about 10 percent and less than about 50 percent of each of the first amount of energy and the second amount of energy. Deposition parameters of the third set of deposition parameters that are different than the first and second sets of deposition parameters include at least one of move pause, a power and/or duty cycle of the energy delivery device, a thickness of the corresponding layer, a size of the melt pool, or a toolpath of the melt pool.

The example method of FIG. 3 includes controlling an energy delivery device and a powder delivery device to deposit outer plurality of layers on the inner plurality of layers based on third set of deposition parameters (110). For example, computing device 12 may control energy delivery device 16 and powder delivery device 14 to deposit the outer plurality of layers 144 on inner layers 134 based on third set of deposition parameters.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Example 1: An additive manufacturing system includes an energy delivery device configured to deliver energy to a build surface of a deposit overlying a substrate to form a melt pool in the build surface; a powder delivery device configured to direct a powder stream toward the melt pool; and a computing device configured to: determine a first set of deposition parameters for an innermost layer of the deposit overlying the substrate; determine a second set of deposition parameters for an inner plurality of layers of the deposit overlying the innermost layer; determine a third set of deposition parameters for an outer plurality of layers of the deposit overlying the inner plurality of layers, wherein the third set of deposition parameters is different from the first and second sets of deposition parameters; and control the energy delivery device and the powder delivery device to: deposit the innermost layer on the substrate based on the first set of deposition parameters, wherein, when operating based on the first set of deposition parameters, the energy delivery device delivers a first amount of energy to the build surface; deposit the inner plurality of layers on the innermost layer based on the second set of deposition parameters, wherein, when operating based on the second set of deposition parameters, the energy delivery device delivers a second amount of energy to the build surface; and deposit the outer plurality of layers on the inner plurality of layers based on third set of deposition parameters, wherein, when operating based on the third set of deposition parameters, the energy delivery device delivers a third amount of energy to the build surface, and wherein the third amount of energy is different than each of the first and second amounts of energy.

Example 2: The additive manufacturing system of example 1, wherein a melting point of the deposit is greater than a melting point of the substrate.

Example 3: The additive manufacturing system of any of examples 1 and 2, wherein the first set of deposition parameters is configured to maintain a size of the melt pool at or below a threshold that corresponds to thermal damage of the substrate.

Example 4: The additive manufacturing system of any of examples 1 through 3, wherein the second set of deposition parameters is configured to maintain a size of the melt pool at or below a threshold that corresponds to melt back of the substrate.

Example 5: The additive manufacturing system of any of examples 1 through 4, wherein deposition parameters of the third set of deposition parameters that are different from the first and second sets of deposition parameters include at least one of move pause, a power and/or duty cycle of the energy delivery device, a thickness of the corresponding layer, a size of the melt pool, or a toolpath of the melt pool.

Example 6: The additive manufacturing system of any of examples 1 through 5, further includes receive the thermal data from the at least one thermal sensor; and determine at least the first set of deposition parameters and the second set of deposition parameters based on the thermal data.

Example 7: The additive manufacturing system of any of examples 1 through 6, wherein a depth of the inner plurality of layers is less than about 1 centimeter.

Example 8: The additive manufacturing system of any of examples 1 through 7, wherein the first set of deposition parameters, the second set of deposition parameters, and the third set of deposition parameters are substantially similar.

Example 9: The additive manufacturing system of any of examples 1 through 8, wherein the first set of deposition parameters is different from the second set of deposition parameters, and wherein the first amount of energy is greater than the second amount of energy.

Example 10: The additive manufacturing system of any of examples 1 through 9, wherein the third amount of energy is greater than about 10 percent and less than about 50 percent of each of the first amount of energy and the second amount of energy.

Example 11: A method for additive manufacturing includes determining, by a computing device, a first set of deposition parameters for an innermost layer of a deposit overlying a substrate; determining, by the computing device, a second set of deposition parameters for an inner plurality of layers of the deposit overlying the innermost layer; determining, by the computing device, a third set of deposition parameters for an outer plurality of layers of the deposit overlying the inner plurality of layers, wherein the third set of deposition parameters is different from the first and second sets of deposition parameters; and controlling, by the computing device, an energy delivery device to deliver energy to the build surface to form a melt pool and a powder delivery device to direct a powder stream toward the melt pool to: deposit the innermost layer on the substrate based on the first set of deposition parameters, wherein, when operating based on the first set of deposition parameters, the energy delivery device delivers a first amount of energy to the build surface; deposit the inner plurality of layers on the innermost layer based on the second set of deposition parameters, wherein, when operating based on the second set of deposition parameters, the energy delivery device delivers a second amount of energy to the build surface; and deposit the outer plurality of layers on the inner plurality of layers based on third set of deposition parameters, wherein, when operating based on the third set of deposition parameters, the energy delivery device delivers a third amount of energy to the build surface, and wherein the third amount of energy is different than each of the first and second amounts of energy.

Example 12: The method of example 11, wherein a melting point of the deposit is greater than a melting point of the substrate.

Example 13: The method of any of examples 11 and 12, wherein the first set of deposition parameters is configured to maintain a size of the melt pool at or below a threshold that corresponds to thermal damage of the substrate.

Example 14: The method of any of examples 11 through 13, wherein the second set of deposition parameters is configured to maintain a size of the melt pool at or below a threshold that corresponds to melt back of the substrate.

Example 15: The method of any of examples 11 through 14, wherein deposition parameters of the third set of deposition parameters that are different from the first and second sets of deposition parameters include at least one of move pause, a power and/or duty cycle of the energy delivery device, a thickness of the corresponding layer, a size of the melt pool, or a toolpath of the melt pool.

Example 16: The method of any of examples 11 through 15, further includes receiving, by the computing device, thermal data from at least one thermal sensor, wherein the thermal data is indicative of a temperature of the melt pool; and determining, by the computing device, at least the first set of deposition parameters and the second set of thermal conditions based on the thermal data.

Example 17: The method of any of examples 11 through 16, wherein a depth of the inner plurality of layers is less than about 1 centimeter.

Example 18: The method of any of examples 11 through 17, wherein the first set of deposition parameters, the second set of deposition parameters, and the third set of deposition parameters are substantially similar.

Example 19: The method of any of examples 11 through 18, wherein the first set of deposition parameters is different from the second set of deposition parameters, and wherein the first amount of energy is greater than the second amount of energy.

Example 20: The method of any of examples 11 through 19, wherein the third amount of energy is greater than about 10 percent and less than about 50 percent of each of the first amount of energy and the second amount of energy.

Various examples have been described. These and other examples are within the scope of the following claims.

What is claimed is:

1. An additive manufacturing system, comprising:

an energy delivery device configured to deliver energy to a build surface of a deposit overlying a substrate to form a melt pool in the build surface;

a powder delivery device configured to direct a powder stream toward the melt pool; and a computing device configured to:

determine a first set of deposition parameters for an innermost layer of the deposit overlying the substrate;

determine a second set of deposition parameters for an inner plurality of layers of the deposit overlying the innermost layer;

determine a third set of deposition parameters for an outer plurality of layers of the deposit overlying the inner plurality of layers, wherein the third set of deposition parameters is different from the first and second sets of deposition parameters; and control the energy delivery device and the powder delivery device to:

deposit the innermost layer on the substrate based on the first set of deposition parameters, wherein, when operating based on the first set of deposition parameters, the energy delivery device delivers a first amount of energy to the build surface;

deposit the inner plurality of layers on the innermost layer based on the second set of deposition parameters, wherein, when operating based on the second set of deposition parameters, the energy delivery device delivers a second amount of energy to the build surface; and deposit the outer plurality of layers on the inner plurality of layers based on third set of deposition parameters, wherein, when operating based on the third set of deposition parameters, the energy delivery device delivers a third amount of energy to the build surface, and wherein the third amount of energy is different than each of the first and second amounts of energy.

2. The additive manufacturing system of claim 1, wherein a melting point of the deposit is greater than a melting point of the substrate.

3. The additive manufacturing system of claim 1, wherein the first set of deposition parameters is configured to maintain a size of the melt pool at or below a threshold that corresponds to thermal damage of the substrate.

4. The additive manufacturing system of claim 1, wherein the second set of deposition parameters is configured to maintain a size of the melt pool at or below a threshold that corresponds to melt back of the substrate.

5. The additive manufacturing system of claim 1, wherein deposition parameters of the third set of deposition parameters that are different from the first and second sets of deposition parameters include at least one of move pause, a power or duty cycle of the energy delivery device, a thickness of the corresponding layer, a size of the melt pool, or a toolpath of the melt pool.

6. The additive manufacturing system of claim 1, further comprising at least one thermal sensor configured to detect thermal data indicative of a temperature of the melt pool, and wherein the computing device if further configured to:

receive the thermal data from the at least one thermal sensor; and determine at least the first set of deposition parameters and the second set of deposition parameters based on the thermal data.

7. The additive manufacturing system of claim 1, wherein a depth of the inner plurality of layers is less than 1 centimeter.

8. The additive manufacturing system of claim 1, wherein the first set of deposition parameters is different from the second set of deposition parameters, and wherein the first amount of energy is greater than the second amount of energy.

9. The additive manufacturing system of claim 1, wherein the third amount of energy is greater than 10 percent and less than 50 percent of each of the first amount of energy and the second amount of energy.

10. A method for additive manufacturing, comprising:

determining, by a computing device, a first set of deposition parameters for an innermost layer of a deposit overlying a substrate;

determining, by the computing device, a second set of deposition parameters for an inner plurality of layers of the deposit overlying the innermost layer;

determining, by the computing device, a third set of deposition parameters for an outer plurality of layers of the deposit overlying the inner plurality of layers, wherein the third set of deposition parameters is different from the first and second sets of deposition parameters; and controlling, by the computing device, an energy delivery device to deliver energy to a build surface of the deposit to form a melt pool and a powder delivery device to direct a powder stream toward the melt pool to:

deposit the innermost layer on the substrate based on the first set of deposition parameters, wherein, when operating based on the first set of deposition parameters, the energy delivery device delivers a first amount of energy to the build surface;

deposit the inner plurality of layers on the innermost layer based on the second set of deposition parameters, wherein, when operating based on the second set of deposition parameters, the energy delivery device delivers a second amount of energy to the build surface; and deposit the outer plurality of layers on the inner plurality of layers based on third set of deposition parameters, wherein, when operating based on the third set of deposition parameters, the energy delivery device delivers a third amount of energy to the build surface, and wherein the third amount of energy is different than each of the first and second amounts of energy.

11. The method of claim 10, wherein a melting point of the deposit is greater than a melting point of the substrate.

12. The method of claim 10, wherein the first set of deposition parameters is configured to maintain a size of the melt pool at or below a threshold that corresponds to thermal damage of the substrate.

13. The method of claim 10, wherein the second set of deposition parameters is configured to maintain a size of the melt pool at or below a threshold that corresponds to melt back of the substrate.

14. The method of claim 10, wherein deposition parameters of the third set of deposition parameters that are different from the first and second sets of deposition parameters include at least one of move pause, a power or duty cycle of the energy delivery device, a thickness of the corresponding layer, a size of the melt pool, or a toolpath of the melt pool.

15. The method of claim 10, further comprising:

receiving, by the computing device, thermal data from at least one thermal sensor, wherein the thermal data is indicative of a temperature of the melt pool; and determining, by the computing device, at least the first set of deposition parameters and the second set of thermal conditions based on the thermal data.

16. The method of claim 10, wherein a depth of the inner plurality of layers is less than 1 centimeter.

17. The method of claim 10, wherein the first set of deposition parameters is different from the second set of deposition parameters, and wherein the first amount of energy is greater than the second amount of energy.

18. The method of claim 10, wherein the third amount of energy is greater than 10 percent and less than 50 percent of each of the first amount of energy and the second amount of energy.

* * * * *